(12) United States Patent
Hagen et al.

(10) Patent No.: US 6,291,988 B1
(45) Date of Patent: Sep. 18, 2001

(54) SENSOR DEVICE

(75) Inventors: Frank Hagen, Ludenscheid; Klaus Hinteresch, Schwerte; Arno Laubrock, Dortmund, all of (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 09/551,120

(22) Filed: Apr. 18, 2000

(30) Foreign Application Priority Data

May 3, 1999  (DE) ................................................ 199 20 111

(51) Int. Cl.$^7$ ...................................................... G01B 7/14
(52) U.S. Cl. ................. 324/207.13; 324/207.15; 267/221
(58) Field of Search .................. 324/207.13, 207.15, 324/207.16, 174; 280/707, 714, 5.519, 5.518; 701/37, 38; 188/266.1; 92/5 R; 267/221

(56) References Cited

U.S. PATENT DOCUMENTS

| | | | |
|---|---|---|---|
| 4,967,359 | * 10/1990 | Sugaswa et al. | .................. 701/37 |
| 5,009,450 | * 4/1991 | Herber et al. | .................. 188/266.1 |
| 5,653,315 | * 8/1997 | Ekquist et al. | .................. 188/266.4 |
| 6,053,488 | * 4/2000 | Forsbach et al. | .................. 267/221 |

FOREIGN PATENT DOCUMENTS 33 12 881 C2   6/1985   (DE).
0 509 244 A1   3/1992   (EP).

* cited by examiner

*Primary Examiner*—Safet Metjahic
*Assistant Examiner*—Subhash Zaveri
(74) *Attorney, Agent, or Firm*—Brooks & Kushman P.C.

(57) ABSTRACT

A sensor device for continuous measurement of the position of a damping piston in a damping cylinder of a vibration damper, used, in particular, in the spring strut of a motor vehicle, is proposed. The corresponding electronic control and evaluation circuit of such a sensor device is to be located in the immediate vicinity of the sensor element and in particular, the problems related to this measure, involving the sealing of the electronic circuit, with respect to the harsh conditions of the corresponding building space, are solved. This is possible in that the sensor element and the electronic control and evaluation circuit are placed within a damping piston, consisting of a basic body and a cover, and are hermetically enclosed, with respect to the outside, by a surrounding seal, lying between the basic body and the cover of the damping piston.

7 Claims, 2 Drawing Sheets

SENSOR DEVICE

TECHNICAL FIELD

The invention concerns a sensor device for continuous measurement of the position of a damping piston in a damping cylinder of a vibration damper, especially used in the spring strut of a motor vehicle.

BACKGROUND ART

Vibration dampers with such sensor devices are used with damping regulators, and particularly, in so-called vehicle movement dynamic systems, where use is made of the most varied sensor principles for the position determination.

Thus, for example, EP 0 509 244 A1 discloses such a sensor device, in which a cylindrical spool, rigidly connected to the damping piston, forms--with the damping cylinder, which is made of magnetizable material--an inductive resistor, which is dependent on their relative position to one another. The evaluation of this resistance gives a measure of the position of the damping piston in the damping cylinder. The electronic control and evaluation circuit of this sensor device is hereby located away from the vibration damper and thus from the sensor element, which brings about an increased susceptibility of the arrangement with respect to external influences. This becomes particularly significant if in order to attain a higher resolution and accuracy of the position signal, the sensitivity of the sensor device is increased or sensor principles which are, per se, more sensitive, are used.

Furthermore, DE 33 12 881 C2 made known a sensor device for the measurement of the position of a damping piston in a damping cylinder of a vibration damper for motor vehicles, in which a sensor element and a control and evaluation circuit is located in the hollow piston rod, which is closed off by a lid. However, whether the measurement signal produced by the sensor device is transmitted to a control device located outside the vibration damper and, if so, how this is done is not disclosed in this publication.

Proceeding from this state of the art, the goal of the invention therefore is to create a sensor device of the initially mentioned type, in which, in particular, the problem of sealing the electronic circuit, with respect to the harsh environmental conditions of the corresponding building space, which is concomitant with placing the pertinent electronic control and evaluation circuit in the immediate vicinity of the sensor element--that is, within the vibration damper, is solved.

The goal of the invention is attained by a sensor device, in which the sensor element and the electronic control and evaluation circuit are located in a housing and are hermetically enclosed, with respect to the outside, by a surrounding seal which lies between the piston rod and the cover of the damping piston, where the connecting cable provided for the electrical connection of the sensor device with a control device located at a distance is conducted through this surrounding seal in a connecting area provided therefore.

Advantageous refinements of the object of the invention can be deduced from the subordinate claims and from the subsequent description of the embodiment examples shown in the drawings.

BEST MODES FOR CARRYING OUT THE INVENTION

Figure 1:
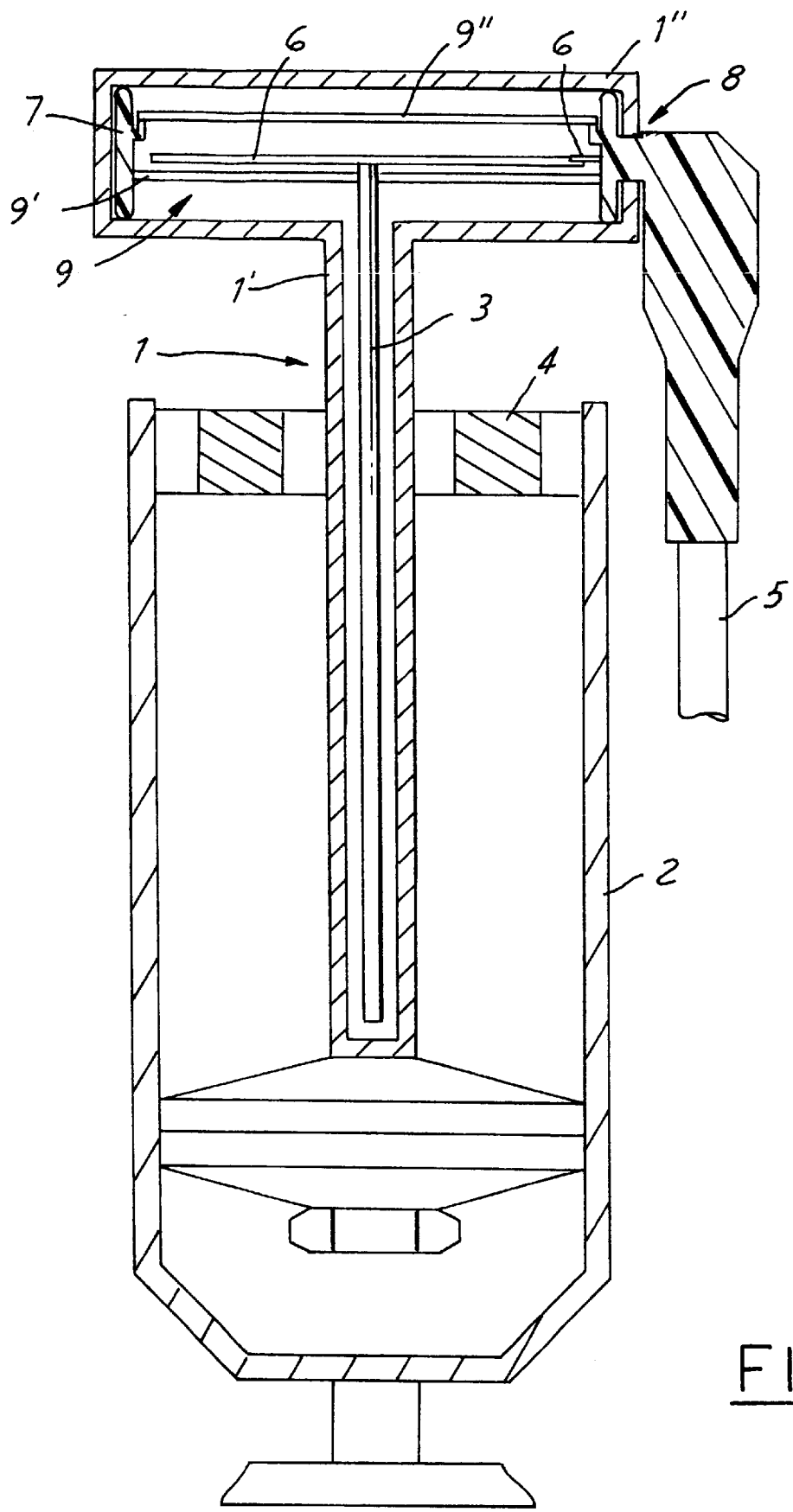
FIG. 1: A schematic sectional representation of a vibration damper for a motor vehicle with a sensor device, in accordance with the invention.

As can be seen from FIG. 1, the hollow, cylindrically constructed piston rod 1' of the damping piston 1 of a vibration damper for a motor vehicle holds a sensor element 3, which belongs to a sensor device for the determination of the relative position of the damping piston 1, with respect to the damping cylinder 2. The sensor element 3, which is, for example, a ferromagnetic wire that operates on the basis of a magnetostrictive effect, is influenced by a permanent magnet 4, connected, in a stationary manner, with the damping cylinder 2, for the production of a longitudinal measurement signal.

The electronic circuit 6, which is provided for the control of the sensor element 3 and for the evaluation of the signals released by it and which is implemented, for example, on a circuit board, is located in the head area of the damping piston 1, closed by a cover 1".

The vibration damper, which is incorporated into the spring strut of a motor vehicle, is exposed to harsh environmental conditions, from which the sensitive electronics of the control and evaluation circuit must be protected. This is done by a surrounding seal, which lies between the piston rod 1' and the cover 1" of the vibration piston 1 and which is formed by a sealing contour 7 made of a thermoplastic elastomer. This sealing contour 7 is brought about as an extrusion coating on the edge of the floor part 9' of a housing 9, provided to hold the circuit 6.

Figure 2A:
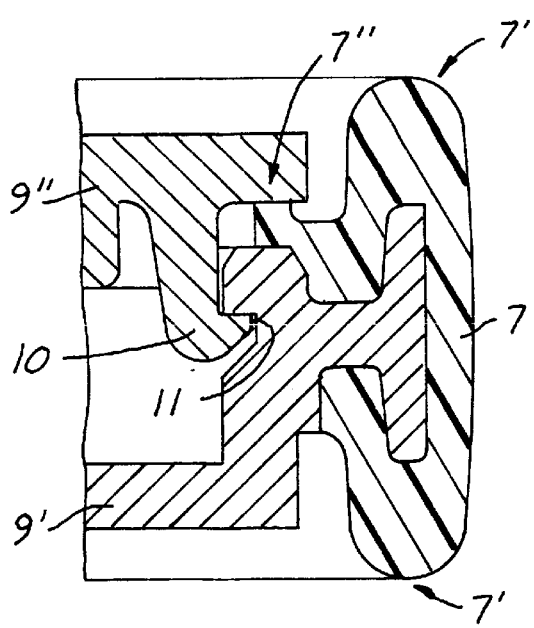
FIG. 2: sectional representations of the sealing contour
 a) before incorporation into the vibration piston
 b) in the incorporated state.
Figure 2B:
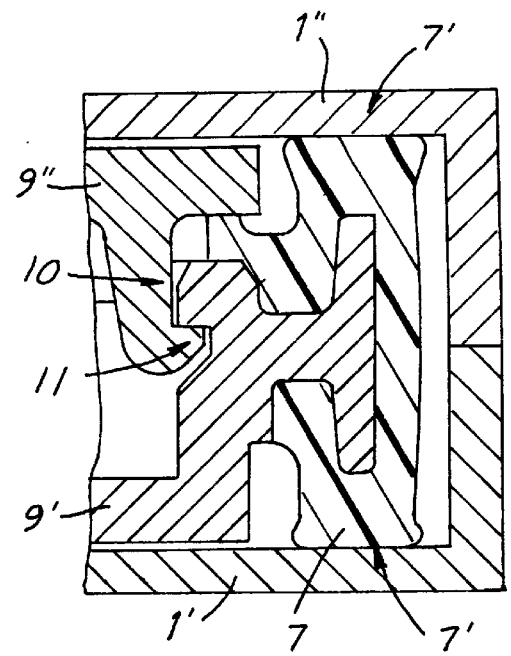
Figure 3:
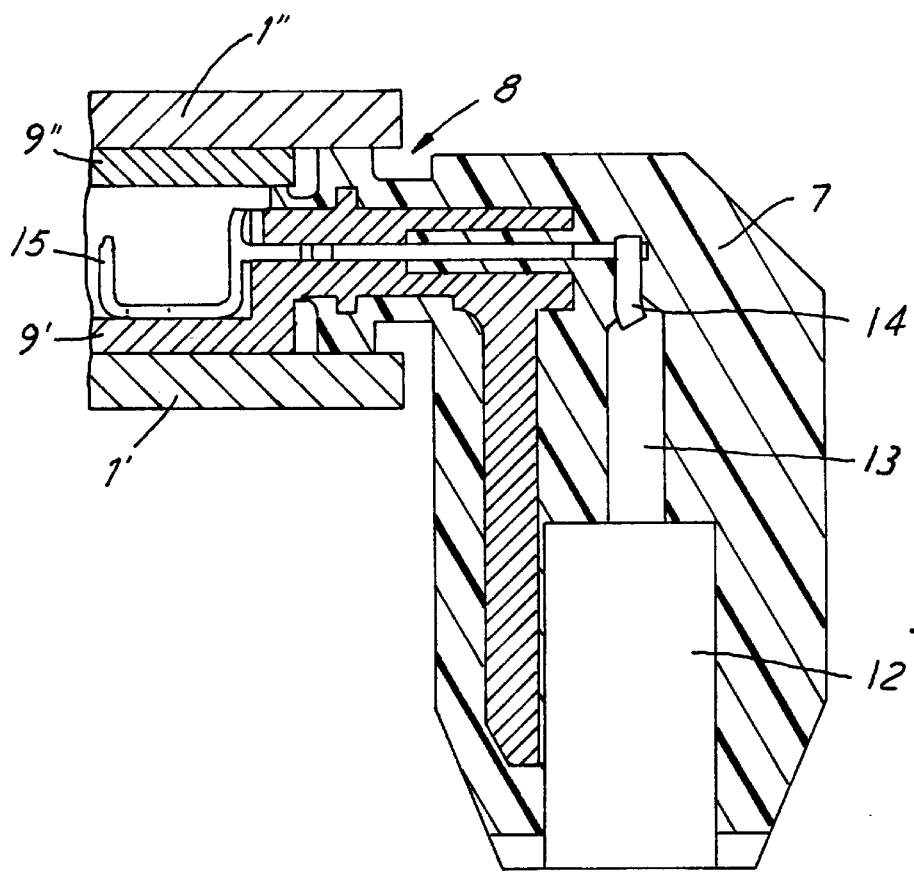
FIG. 3: an enlarged sectional representation of the connecting area.

As can be seen more precisely from FIG. 2a), the sealing contour 7 has upper and lower main sealing surfaces 7', which are provided with radii and which in the incorporated state shown in FIG. 2b), come to rest, under pressure, on corresponding counter-surfaces on the piston rod 1' and cover 1" of the damping piston 1. For the sufficiently tight closure of the housing 9 before the incorporation of the sensor device into the damping piston 1, in particular, as transport protection for the sensitive electronics, the housing 9 is provided with a cover 9". This cover 9" is connected to the housing by means of clip elements 10, which engage with back incisions 11 in the bottom part 9' of the housing 9, corresponding to them. The cover 9" comes to rest, under pressure, on an auxiliary sealing surface 7" of the sealing contour 7, wherein a sufficient tightness is guaranteed for the transport and handling during the final incorporation into the damping piston 1. In the connecting area 8, shown in detail in FIG. 3, the wires 14 of a connecting cable, provided for the connection of the sensor device to a control device located at a distance, are conducted through the sealing. The wires 14 of the connecting cable are thereby welded to joining plates 15, which, in the connecting area 8, penetrate the housing wall of the bottom part 9' of the housing 9 and in the interior of the housing, are electrically connected to the circuit 6. In the outside area, the extrusion coating, forming the sealing contour, is made with a thermoplastic elastomer so that the connection site between the wires 14 and the joining plates 15 and a piece of the connecting cable 5 are also comprised by it. To attain an optimal sealing effect, both the individual insulations 13 of the wires 14 and the outer insulation jacket 12 comprising them are made of the same thermoplastic elastometer material as the extrusion coating. These materials enter into a material-locking bond because of the pressures and temperatures arising during the extrusion coating process, so that in particular, moisture cannot penetrate the housing 9 either from the outside space or along the conduit.

What is claimed is:

1. A vibration damper for a motor vehicle, the vibration damper comprising:

a damping cylinder;

a damping piston having a hollow piston rod movable in the damping cylinder, the damping piston having a damping piston cover over the hollow piston rod;

a housing within the damping piston cover;

a sensor device having a sensor element and an electronic circuit, the sensor element being operable for generating a position signal indicative of the position of the piston rod with respect to the damping cylinder, the electronic circuit being electrically connected to the sensor element for receiving the position signal, wherein the sensor element and the electronic circuit are located within the housing between the hollow piston rod and the damping piston cover;

a seal lying between the hollow piston rod and the damping piston cover and being associated with the housing to seal the electronic circuit within the housing;

a plate located within the housing and being electrically connected to the electronic circuit at a first end and running through the seal at a second end; and a connector electrically connected to the second end of the plate to electrically connect with the electronic circuit for electrically connecting the sensor device to a control device located remote from the vibration damper to provide the control device with the position signal.

2. The vibration damper of claim 1 wherein:
the housing has a plastic floor and a plastic roof.

3. The vibration damper of claim 2 wherein:
the seal includes an elastic plastic sealing contour formed on the plastic floor of the housing.

4. The vibration damper of claim 3 wherein:
the plastic sealing contour has an auxiliary sealing surface corresponding to a counter surface on the plastic roof of the housing.

5. The vibration damper of claim 2 wherein:
the housing includes securing means for connecting the plastic floor to the plastic roof of the housing.

6. The vibration damper of claim 1 wherein:
the connector includes a plurality of wires each individually surrounded by insulation, the plurality of wires being surrounded by an outer jacket, wherein the individual insulations, the outer jacket, and the seal enter into an intimate material locking bond during an extrusion process.

7. The vibration damper of claim 6 wherein:
the individual insulation of each wire of the cable, the outer jacket, and the seal include a thermoplastic elastomer.

* * * * *